United States Patent [19]
Yu

[11] Patent Number: 5,610,979
[45] Date of Patent: Mar. 11, 1997

[54] MOBILE PHONE HOLDER HAVING SECURITY AND CHARGING FUNCTION

[76] Inventor: Wen-chung Yu, 1F, 34, Alley 4, Lane 48 Pihua Str. Sanchung, Taipei, Taiwan

[21] Appl. No.: 530,584

[22] Filed: Sep. 19, 1995

[51] Int. Cl.$^6$ .................................................... H04M 1/00
[52] U.S. Cl. ........................ 379/455; 379/446; 379/426; 379/454
[58] Field of Search ................................. 379/455, 454, 379/426, 446, 447, 428; 455/128, 89, 90

[56] References Cited

U.S. PATENT DOCUMENTS 5,388,155  2/1995  Smith ........................................ 379/446

Primary Examiner—Thomas W. Brown
Assistant Examiner—Jack Chiang
Attorney, Agent, or Firm—Jacobson, Price, Holman & Stern, PLLC

[57] ABSTRACT

A mobile phone holder having security and charging functions includes a leather bag, a transmitting circuit and a signal receiver. The leather bag is provided with a button to be attached with a receptacle for receiving electricity from a charging set. An pair of electrical conductors are provided within the bag and are in contact with the button. The transmitting circuit is provided within the bag and is in contacted with the electrical conductors. The transmitting circuit is powered by the battery of the mobile phone via the electrical conductors. The signal receiver is in electrical connecting with the transmitting circuit to announce a beeper when the signal receiver is disenabled while kept silent when the signal receiver is enabled by the transmitting circuit.

3 Claims, 4 Drawing Sheets

MOBILE PHONE HOLDER HAVING SECURITY AND CHARGING FUNCTION

FIELD OF THE INVENTION

This invention relates to a mobile phone holder, more particularly, to a leather bag for a mobile phone having security and charging function. The owner of said mobile phone can be advised when said mobile phone is taken by an unauthorized person.

The market available mobile phones are short off the function of anti-theft and the warning of low battery. If the mobile phone is lost in somewhere or being stolen by a theft. The user will lose his mobile phone forever. On the other hand, since the mobile phone is powered by battery, the mobile phone will not work once the voltage of the battery is lowered to a certain level. Accordingly, the user can not use it to communicate with other or receiving calling. No doubt, the interests of the owner will be impacted. Besides, the existing leather bag of the mobile phone serves only for a protection against any scratch of the surface and the humidity to the inner parts of the mobile phone. This is what the conventional leather bag call provide. The owner can not be advised even when the mobile phone is lost. Accordingly, the bag for the mobile phone needs to be improved.

In order to overcome the problems encountered by the mobile phone and its bag, a mobile phone bag having security and charging function.

It is the object of this invention to provide a leather bag for the mobile phone which can provides function of anti-theft and charging.

It is still the object of this invention to provide a leather bag which can advise the user when the battery is at low voltage.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of a leather bag for mobile phone, wherein.

DETAILED DESCRIPTION OF PREFERRED EMBODIMENT

Figure 1:
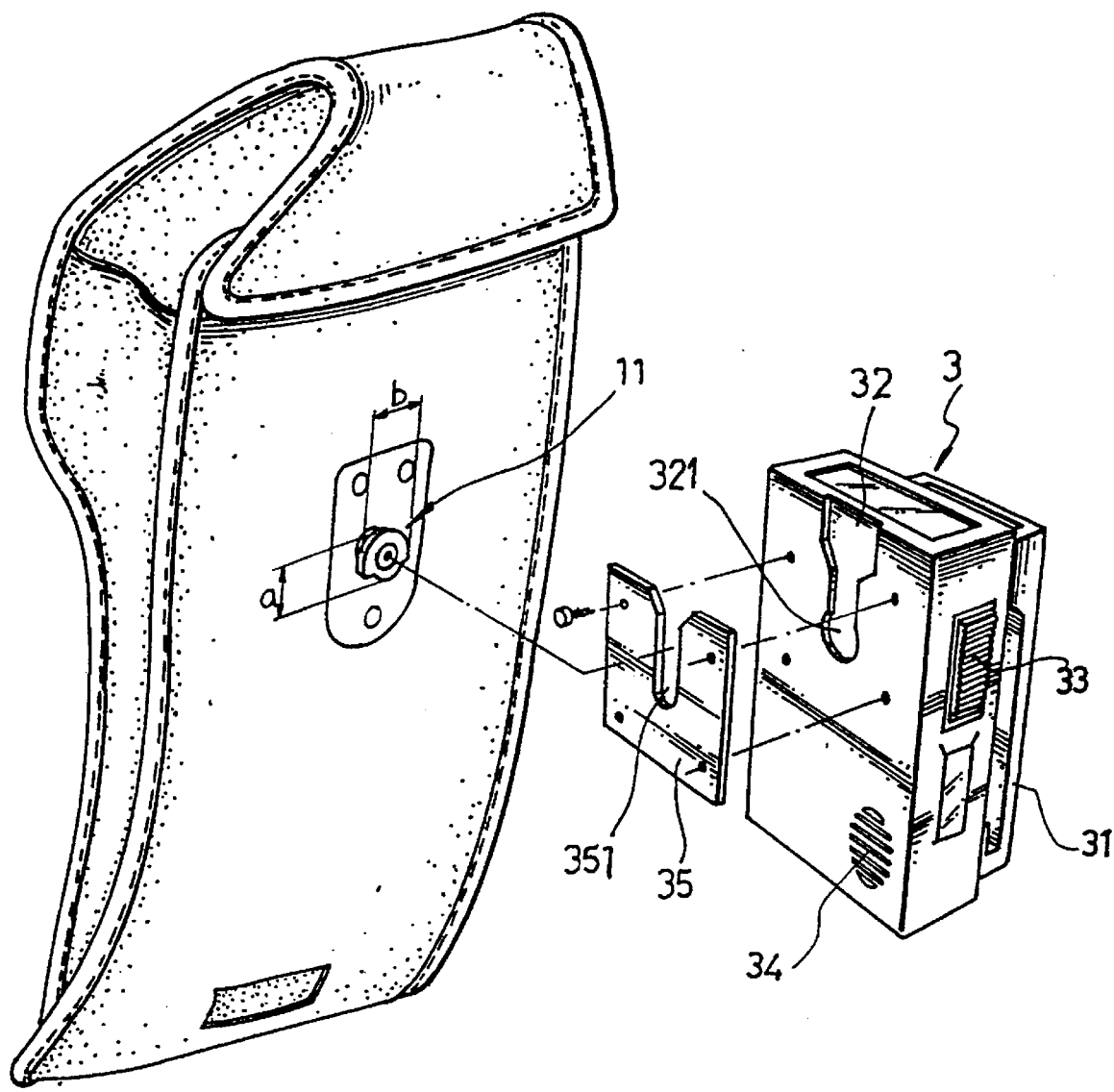
FIG. 1 is a perspective view showing the disposition of the leather bag and the signal receiver according to the present invention.
Figure 2:
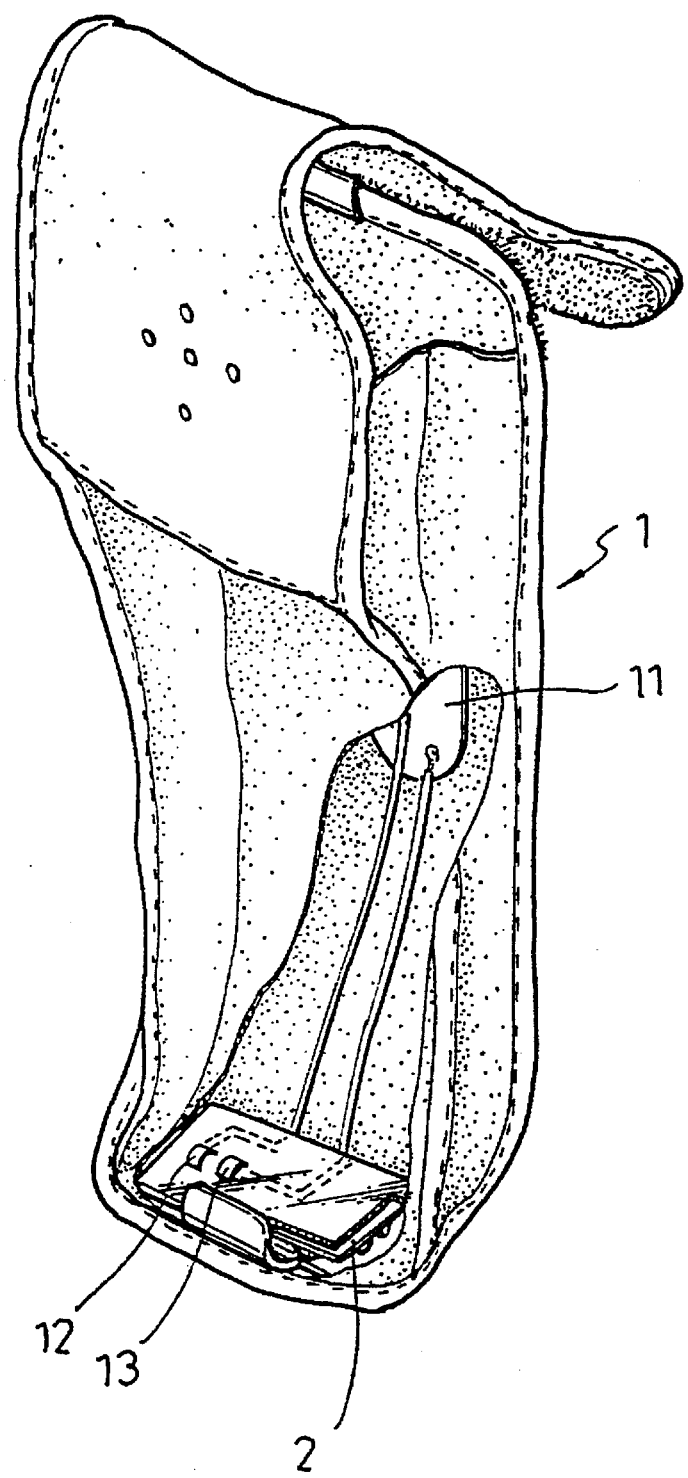
FIG. 2 is a front view of the leather bag made according to the present invention, wherein the bag is partially cut away to disclose the inner side of said bag.

Referring to FIGS. 1 and 2, the leather bag for the mobile phone having the security and charging function is configured a leather bag 1, signal transmitting circuit 2 and signal receiver 3. The mobile phone is enveloped within said bag 1 and the back side of said bag 1 is provided with an attaching button 11. The attaching button 11 is shaped like a parasol in the upper portion of which, a semicircular body in longer diameter is shaped at one side, and a semicircular body in a little shorter diameter is shaped at the other side.

As shown in FIG. 2, said leather bag 1 is provided with an electrical conductors 12, 13 which extend into the inner space of said bag 1 by its ends in such a manner that the positive and negative terminals of the mobile phone are in contact with said electrical conductors 12, 13. A transmitting circuit 2 is incorporated at the other side of said bag 1 which is again in contact with the electrical by its positive and negative terminals. Accordingly, the transmitting circuit 2 is powered by the battery of the mobile phone.

Besides, the rechargeable battery of the mobile phone is charged by a charging set via the connection between the button 11 of tile bag 1 and a receptacle of the charging set. Accordingly, the charging set provides the electricity to the rechargeable battery of the mobile phone.

Referring to FIGS. 1 to 5, a clip 31 is provided at the rear side of the signal receiver 3. By this arrangement, the signal receiver 3 is capable of attaching to the belt 4 of the user. A controlling switch 33 is provided at the side of the receiver 3. Accordingly, the operation of the receiver 3 is controlled by the switch 33. A beeper 34 is incorporated at side.

Figure 4:
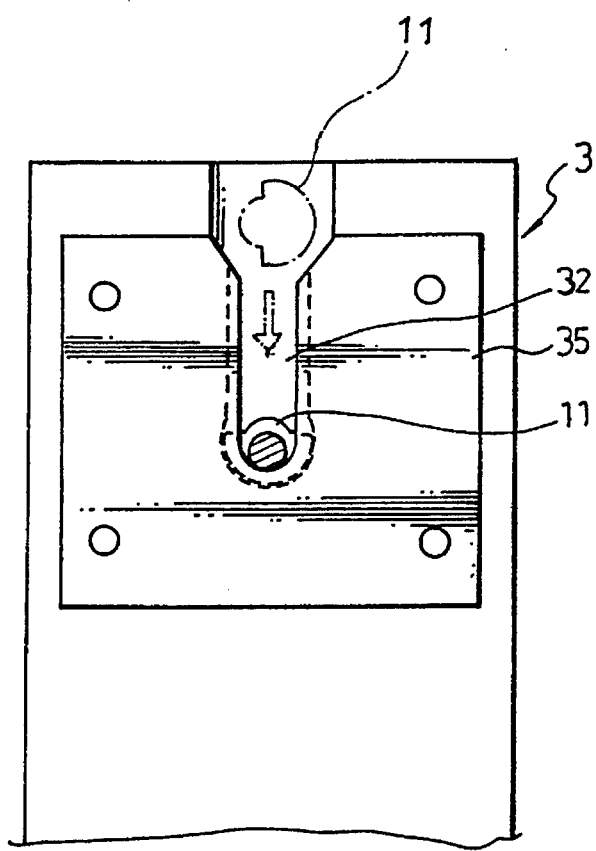
FIG. 4 is a perspective view showing the attaching button is attached to the signal receiver.
Figure 3:
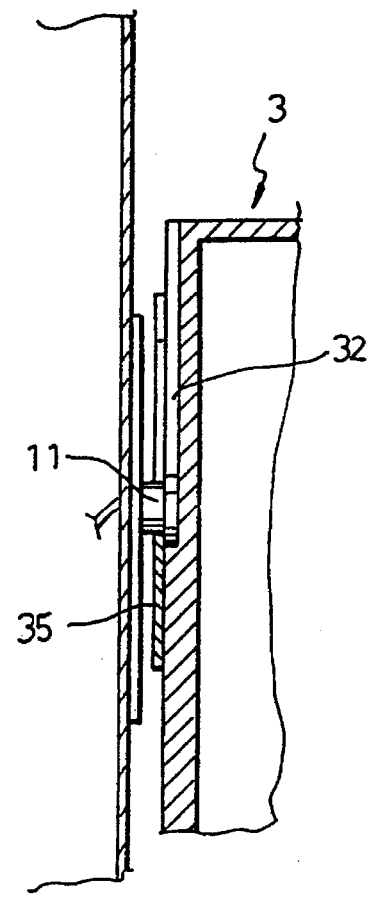
FIG. 3 is a sectional view showing the leather bag of the present invention is attached to the signal receiver.
Figure 5:
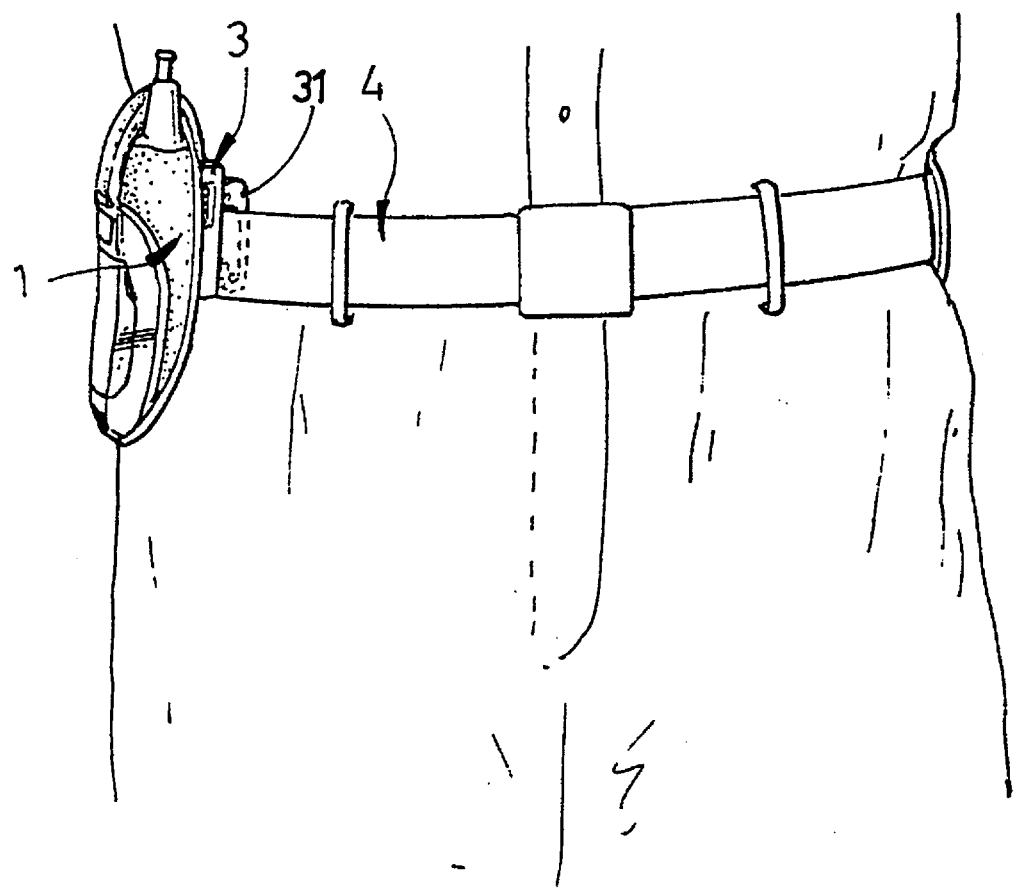
FIG. 5 is sketch view showing the leather bag is attached to the belt of the user.

As shown in FIGS. 1, 3 and 4, a receptacle 32 is provided at the front of the receiver 3 for receiving the button 11 of the bag 1. The width of the receptacle 32 is equal to the shorter shaft width a of the two semicircular bodies in the upper portion of the button 11 of the bag 1. The opening of the receptacle has V-shape slants at one end and a circular groove 321 at the other end. The diameter of the circular groove 321 is equal to the longer shaft width b of the semicircular body of the button 11.

The signal receiver 3 has a cover plate 35 riveted at the upper face thereof to cover the receptacle 32. The cover plate 35 is provided with a rectangular hole 351 corresponding to the receptacle 32. The width of the rectangular hole 351 is a little smaller than that of the receptacle 32. Therefore, as shown in FIG. 4, the bag 1 is sloped so that the button 11 can slide along the receptacle 32 to arrive at the circular groove 321 to be firmly retained therein after the bag 1 returns to normal.

The signal receiver 3 is designed to match the signal transmitting circuit 2. The signal receiver 3 is set to receive the range of the operating frequency emitted from the transmitting circuit 2. When the receiver 3 receives the frequency emitted from the transmitting circuit 2 continuously, the circuit of the beeper 34 is disenabled. If the signal receiver 3 is out of the range of the operating frequency emitted from the transmitted circuit 2, or the charging set is run off its voltage or an electrical failure is found, that mean the rechargeable battery of the mobile phone is disconnected with the electrical conductors 12, 13, then the circuit of the beeper is enabled to alarm. Accordingly, the owner is advised by the alarm that he/she should take some steps to prevent something to be happened. Consequently, the mobile phone is prevented from being lost, run off its voltage or mis-alignment of the connections between terminals. Then replacing a new battery set or adjusting the terminals can be done as soon as possible to overcome the difficulty.

Although the present invention has been described in connection with the preferred embodiment thereof, many other variations and modifications will now become apparent to those skilled in the art without departing from the scope of the invention. It is preferred, therefore, that the present invention not be limited by the specific disclosure herein, but only by the appended claims.

I claim:

1. A mobile phone holder having security and charging functions comprising a leather bag, a signal transmitting circuit and a signal receiver, characterized in that said leather bag is adapted for receiving a mobile phone and is provided with a connection button, a pair of electrical conductors being provided within said bag and having terminals adapted to contact with positive and negative terminals of a battery of said mobile phone;

said transmitting circuit being provided on said bag, said transmitting circuit being connected to said electrical conductors to be powered by said battery of said mobile phone; and said signal receiver being adapted to receive signals from said transmitting circuit when the transmitting circuit is powered by said battery, said signal receiver being provided with a clip for attaching said receiver on a belt, a receptacle being provided at a front portion of the receiver for connection with said button, a controlling switch being provided on said receiver, a beeper being provided on said receiver and being eleotrically connected to the signal receiver so as to be actuated when the signal receiver ceases to receive signals from said transmitting circuit.

2. A holder as claimed in claim 1 wherein said button has a wide outside end and a narrow neck and wherein said receptacle comprises a slot in the receiver into which the neck of the button is adapted to slide.

3. A holder as claimed in claim 1 wherein the button has electrical connection with said conductors so that the button can be connected to a charging set for charging the battery of the mobile phone.

* * * * *